United States Patent [19]

Eguchi et al.

[11] Patent Number: 4,972,337
[45] Date of Patent: Nov. 20, 1990

[54] DEVICE FOR CONTROLLING ROTATION OF A MAGNET USED IN A MAGNETO-OPTICAL RECORDING SYSTEM

[75] Inventors: Naoya Eguchi, Tokyo; Osamu Kawakubo, Saitama; Hitoshi Okada, Chiba; Tamotsu Maeda, Kanagawa; Susumu Tosaka, Tokyo, all of Japan

[73] Assignee: Sony Corporation, Tokyo, Japan

[21] Appl. No.: 131,640

[22] Filed: Dec. 11, 1987

[30] Foreign Application Priority Data

Dec. 11, 1986 [JP] Japan .................................. 61-293443
Mar. 18, 1987 [JP] Japan .................................. 62-061279

[51] Int. Cl.⁵ ....................... G11B 11/10; G11B 13/04
[52] U.S. Cl. ..................................... 369/013; 360/114
[58] Field of Search .................. 369/13, 120, 128, 130; 360/59, 114; 365/122; 324/208; 350/247, 255, 6.3, 245

[56] References Cited

U.S. PATENT DOCUMENTS 4,629,982 12/1986 Kieslich .............................. 324/208
4,748,606 5/1988 Naito et al. .......................... 369/13
4,769,803 9/1988 Yamamiya .......................... 350/6.3

FOREIGN PATENT DOCUMENTS 126596 11/1984 European Pat. Off. .............. 369/13
127243 12/1984 European Pat. Off. .............. 369/13
3510620A1 10/1986 Fed. Rep. of Germany ........ 369/13
61-250801 11/1986 Japan ................................... 369/13

Primary Examiner—Stuart S. Levy
Assistant Examiner—Hoa T. Nguyen
Attorney, Agent, or Firm—Hill, Van Santen, Steadman & Simpson

[57] ABSTRACT

A rotation control for a magnet used in a magneto-optical recording system having a first coil that rotates a permanent magnet to invert the polarity of its magnetic field applied to an optical recording type disc and a second coil provided at the position displaced from the central line of the first coil and for applying a driving force to the permanent magnet when the permanent magnet begins to rotate, wherein the permanent magnet can be settled in quite a short time after it is inverted in polarity by controlling a drive current applied to the second coil.

7 Claims, 5 Drawing Sheets

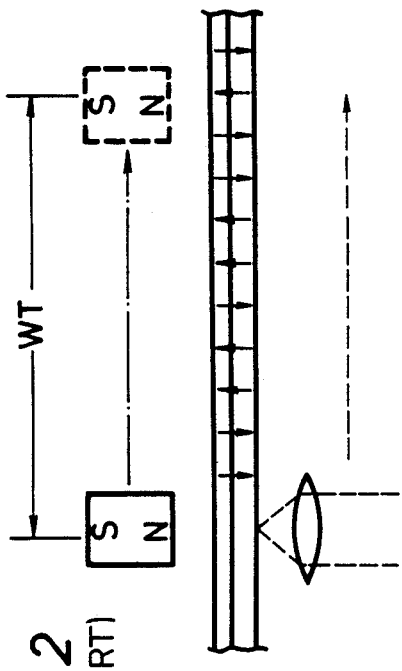
FIG. 2
(PRIOR ART)
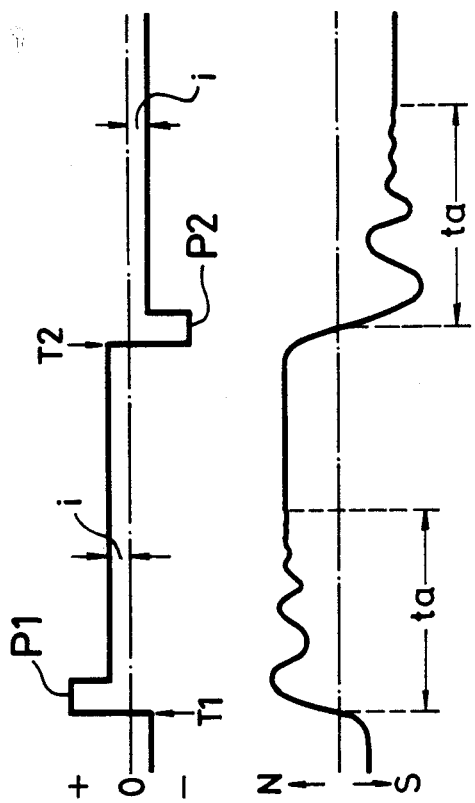
FIG. 3A
(PRIOR ART)
FIG. 3B
(PRIOR ART)
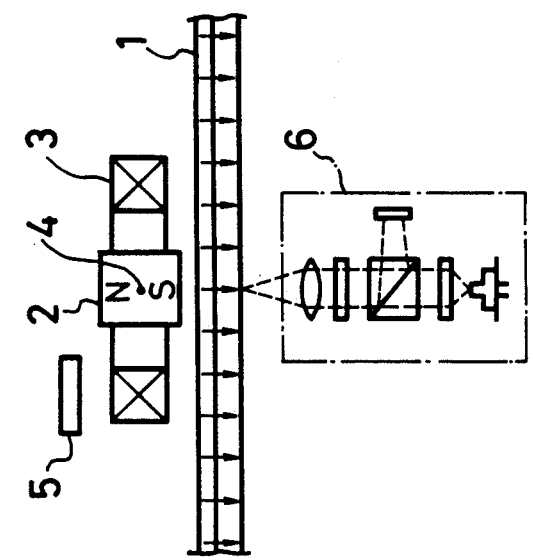
FIG. 1
(PRIOR ART)

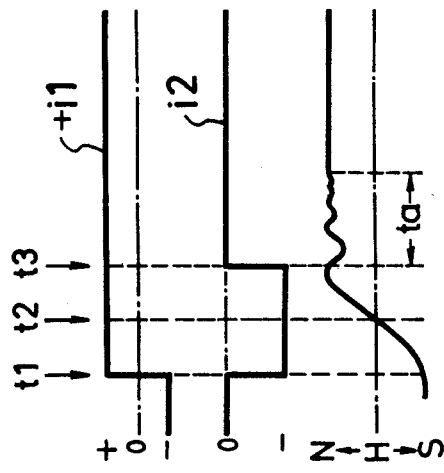
FIG. 6
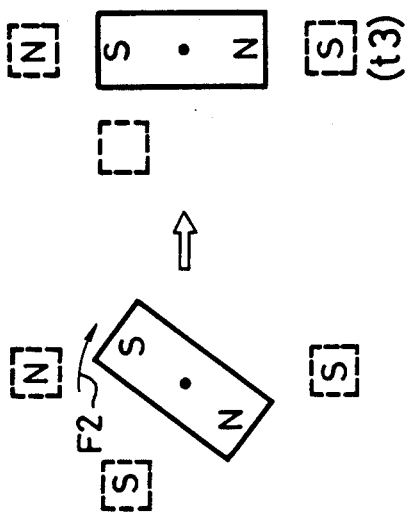
FIG. 7A  FIG. 7B
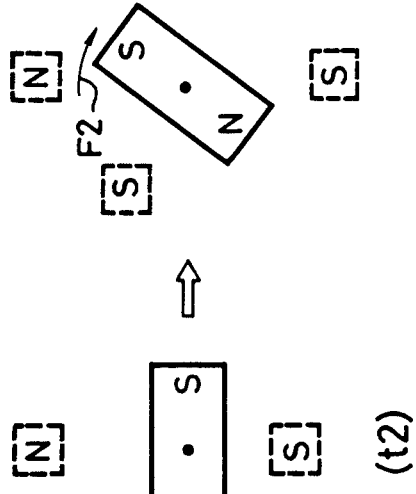
FIG. 7C
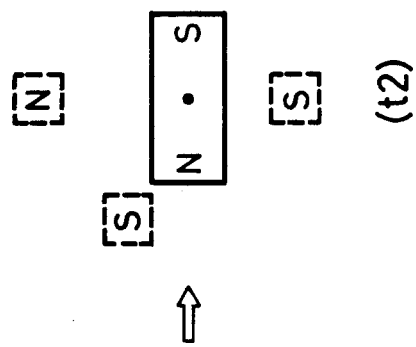
FIG. 7D  FIG. 7E
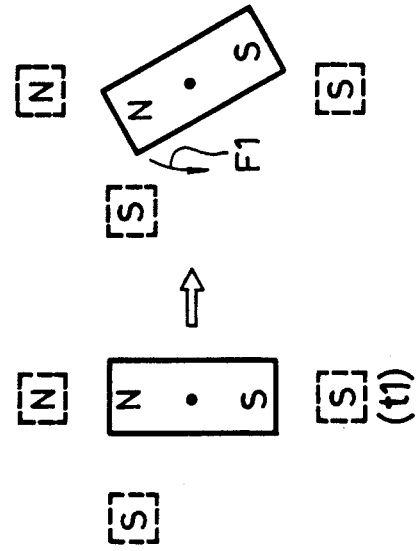

DEVICE FOR CONTROLLING ROTATION OF A MAGNET USED IN A MAGNETO-OPTICAL RECORDING SYSTEM

This application relates to copending application U.S. Ser. No. 012,458 filed Dec. 29, 1986, now U.S. Pat. No. 4,748,606.

BACKGROUND OF THE INVENTION

1. Field of the Invention

The present invention relates to a rotation control for a magnet used in a magneto-optical recording system and is directed more particularly to an apparatus for applying a magnetic field to an optical disc when an information is recorded on the optical disc.

2. Description of the Prior Art

An optical disc has a recording layer formed on its recording face. This recording layer is generally a magnetic thin film made of such as GdCo, FeTe, GdTbFe or the like. There is already proposed an apparatus by which information can be recorded on the recording layer of the optical disc by irradiating the layer with a laser beam and applying a magnetic field to the recording layer so that a magnetization formed in the recording layer in the direction perpendicular thereto is inverted by the Kerr effect.

Since such an optical recording disc is capable of recording data produced by a laser beam spot of several microns of meters much information can be recorded therein at a very high recording density, and thus it is useful as an external storage apparatus for a computer or the like. When data is recorded on or erased from the optical recording disc, a magnetic field of particular polarity must be applied to the recording layer of the optical recording disc.

FIG. 1 is a schematic representation of an apparatus used to apply a magnetic field to an optical recording disc.

Referring to FIG. 1, there is located on an optical disc 1 a recording layer having the magneto-optical effect. A permanent magnet 2 (hereinafter simply referred to as a magnet is provided to apply a magnetic field to the optical disc 1 at its surface. A coil 3 is provided to concentrically surround the magnet 2. When a current is supplied to the magnetic coil 3 in a particular direction, the magnet 2 rotates around a supporting shaft 4 to face its N pole or S pole to the surface of the optical disc 1. A magnetic member 5 is located at a position displaced from the center of the magnet 2. When the coil 3 is supplied with a current that inverts the magnet 2 in polarity, the magnet 2 is at first attracted to the magnetic member 5 and rotated in the counter-clockwise direction. Then, the magnet 2 is rotated by 180° to exchange its N pole and S pole. An optical head 6 is provided to irradiate the recording surface of the optical disc 1 with a laser beam.

When information is recorded by such recording apparatus on the optical disc 1 (so-called orientation disc) in which its recording layer is magnetized in the same direction as shown in FIG. 1 by arrows, the power of the laser beam must be intensified and at the same time, the coil 3 must be supplied with a current opposite in direction to thereby rotate the magnet 2 by 180°, thus inverting the magnetic field applied to the surface of the optical disc 1. Then, if the optical disc 1 is rotated while the laser beam is being modulated in view of data to be recorded, the magnetization in the recording layer on the portion irradiated by the laser beam is inverted as represented by arrows in FIG. 2, thus making it possible to record the data in the recording layer during a time duration WT.

As described above, the conventional optical disc recording apparatus employs the coil 3 to invert the magnet 2 in polarity upon recording (or erasing) the data. In order to record or erase data more rapidly, the magnet 2 must be inverted in polarity stably and more quickly. Thus, the coil 3 must be supplied with a larger inverting current.

When the optical disc recording apparatus is placed in its recording mode, the coil 3 is supplied with a large start or kick signal P1 at time T1 as shown in FIG. 3A. Thereafter, the coil 3 is supplied with a current i that keeps the magnet 2 in its inverted state. At the completion of the recording, at time T2, a kick signal P2 of opposite polarity to the signal P1 is supplied to the coil 3 and then, the coil 3 is supplied with a current i that keeps the magnet 2 in its initial state. Although then the direction of the magnetic field to the surface of the optical disc 1 is inverted from the N pole to the S pole as shown in FIG. 3B, the magnet 2 is accelerated and decelerated at the completion of the inversion due to the existence of the magnetic member 5 and the attracting force caused by the holding current i supplied to the coil 3, so that until the magnet 2 is settled at a predetermined position a longer settling time ta is required.

As a result, it takes a lot of time for the optical disc recording apparatus to be set in the recording mode for the optical disc 1. Thus, when the optical disc 1 is employed as an external storage apparatus for the computer or the like, it takes a lot of operation time.

OBJECTS AND SUMMARY OF THE INVENTION

Accordingly, it is an object of the present invention to provide an improved rotation control for a magnet used in a magneto-optical recording system.

It is another object of the present invention to provide rotation control for a magnet used in a magneto-optical recording system whereby a magnet with its polarity inverted can be settled in a predetermined direction in a relatively short time period.

According to one aspect of the present invention, there is provided a rotation control for a magnet used in a magneto-optical recording system comprising:

(a) magnet means rotatably located adjacent the surface of an optical recording type disc;

(b) first coil means disposed to surround said magnet means with the same as a center and for generating a magnetic field perpendicular to the surface of said optical recording type disc;

(c) second coil means located at a position displaced from the central line of said first coil means in the direction of the circumference of said optical recording type disc;

(d) means for supplying to said first coil means a first drive current that inverts the polarity of said magnet means;

(e) means for supplying to said second coil means a second drive current that rotates said magnet means to the side of said second coil mean when said magnet means begins to rotate; and (f) means for stopping the supply of said second drive current before said magnet means stops its rotation.

According to another aspect of the present invention, there is provided a rotation control for a magnet used in a magneto-optical recording system comprising:

(a) magnet means rotatably located adjacent the recording surface of an optical recording type disc;

(b) first coil means disposed to surround said magnet means with the same as a center and for generating a magnetic field perpendicular to the surface of said optical recording type disc;

(c) second coil means located at the position displaced from the central line of said first coil means in the direction of the circumference of said optical recording type disc;

(d) sensor means for detecting a rotational displacement of said magnet means;

(e) means for supplying said first coil means with a first drive current that inverts the polarity of said magnet means;

(f) means for supplying to said second coil means a second drive current that rotates said magnet means to the side of said second coil means when said magnet means begins to rotate;

(g) means for stopping the supply of said second drive current before said magnet means stops its rotation; and (h) means for supplying a signal from said sensor means to said second coil means thereby t reduce a time necessary for said magnet means to settle.

These and other objects, features and advantages of the present invention will become apparent from the following detailed description of the preferred embodiments, to be taken in conjunction with the accompanying drawings, in which like reference numerals represent the same or similar elements and parts.

BRIEF DESCRIPTION OF THE DRAWINGS

FIG. 1 is a schematic representation of a prior art apparatus used to apply a magnetic field to an optical disc;

FIG. 2 is a schematic representation used to explain the recording operation on the optical disc;

FIGS. 3A and 3B are waveform diagrams of an inverting drive signal and a magnetic field applied to the optical disc in the prior art, respectively;

FIG. 6 is a waveform diagram showing currents used in the present invention;

FIGS. 7A to 7E are schematic representations used to explain the inversion of a magnet used in the invention, respectively;

DETAILED DESCRIPTION OF THE PREFERRED EMBODIMENTS

The present invention will now be described in detail with reference to the drawings.

Figure 4:
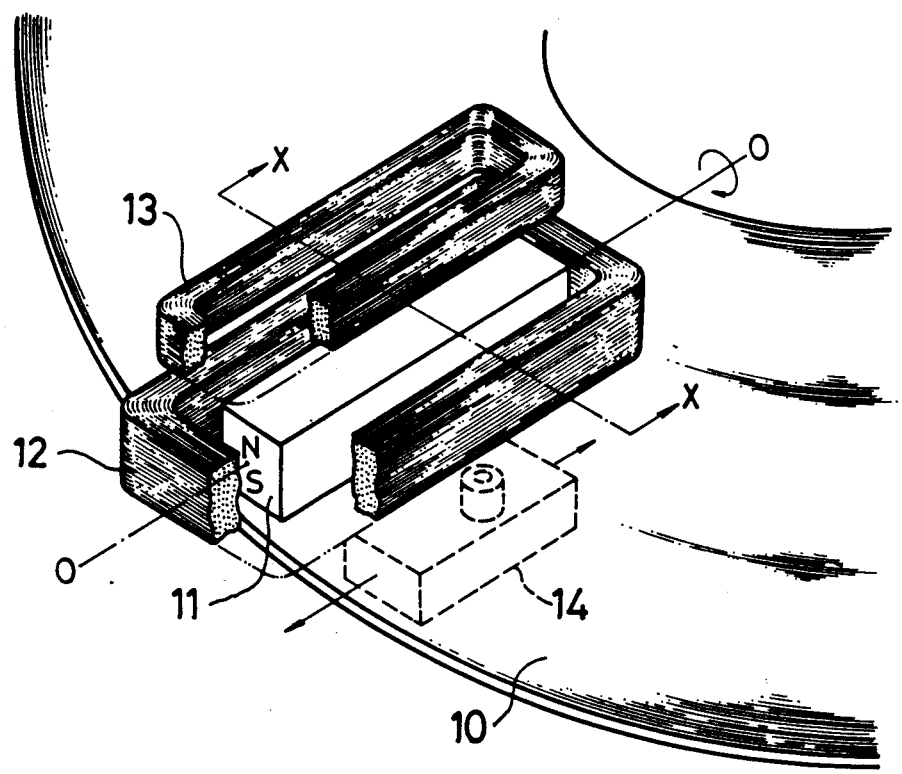
FIG. 4 is a partially-exploded perspective view of an embodiment of a rotation control for a magnet used in a magneto-optical recording system according to the present invention.

FIG. 4 illustrates an embodiment of a rotation control for a magnet used in a magneto-optical recording system according to the present invention.

Referring to FIG. 4, reference numeral 10 designates an optical disc which is referred to as a recording type optical disc. A permanent magnet 11 is provided which is made of a ferromagnetic material or the like and has strong residual magnetism. This permanent magnet 11 is rotatably supported around an axis O—O parallel to the surface of the optical disc 10 and above same by a support shaft (not shown). A first coil 12 is provided to drive the magnet 11 so as to face its S (South) pole or N (North) pole to the surface of optical disc 10. Also, the first coil 12 keeps the magnet 11 in that position. To this end, the first coil 12 is located so as to concentrically surround the magnet 11 and generate a magnetic field in the direction perpendicular to the surface of the optical disc 1, when the coil 12 is supplied with a current.

A second coil 13 is provided above the first coil 12 and located at a position displaced from the center of the first coil 12 in the direction of the circumference of the optical disc 10.

An optical pickup 14 is provided, as represented by dashed lines in FIG. 4. This optical pickup 14 irradiates the optical disc 10 with a laser beam from its lower surface as is known in the prior art.

Figure 5:
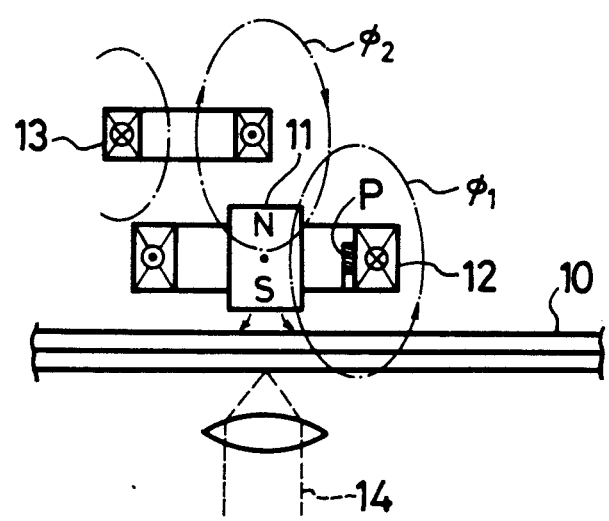
FIG. 5 is a cross-sectional view taken along a line X—X in FIG. 4.

The operation inverting the magnet 11 will be described with reference to FIGS. 5, 6 and 7A–7E. FIG. 5 is a cross-sectional view taken along a line X—X in FIG. 4, FIG. 6 is a waveform diagram showing waveforms of currents fed to the first and second coils 12 and 13, and FIGS. 7A to 7E are schematic representations illustrating the rotation positions of the magnet 11.

When the first coil 12 is supplied with a positive current i1 and the second coil 13 is supplied with a negative current i2 at time t1, as shown in FIG. 6, imaginary magnetic poles N and S are respectively formed by magnetic fluxes $\phi 1$ and $\phi 2$ generated by the coils 12 and 13 in the direction perpendicular to the surface of the optical disc 10, as shown in FIG. 7 by broken line blocks. Thus, a drive force F1, shown by an arrow in FIG. 7B, that rotates the magnet 11 in the counter-clockwise direction, is applied to the magnet 11 during the period starting from time t1 to nearly time t2 so that the magnetic field applied to the surface of optical disc 10 by the magnet 11 is made to be substantially zero as shown in FIG. 7C. While the magnet 11 keeps rotating after time t2, during the period from time t2 to time t3, by the S pole of the magnet 11 and the magnetic field generated by second coil 13, there is produced a repulsive force F2 shown by an arrow in FIG. 7D, whereby the magnet 11 is decelerated during this period.

Accordingly, the magnet 11 is accelerated during the first half of 180° rotation period thereof and decelerated during the second half thereof. Thus, when the current i2 supplied to the second coil 13 is made to be zero immediately before time t3 at which the magnet 11 is rotated by 180° as shown in FIG. 6, the magnet 11 is settled rapidly and maintained at that position by the positive current flowing through the first coil 12.

In this case, considering the current flowing through the first coil 12, the position of the second coil 13, the value of the current flowing through the second coil 13, the inertial force of magnet 11 or the like, it is possible to provide the shortest settling time ta by controlling the waveform of the current supplied to the second coil 13.

Figure 8:
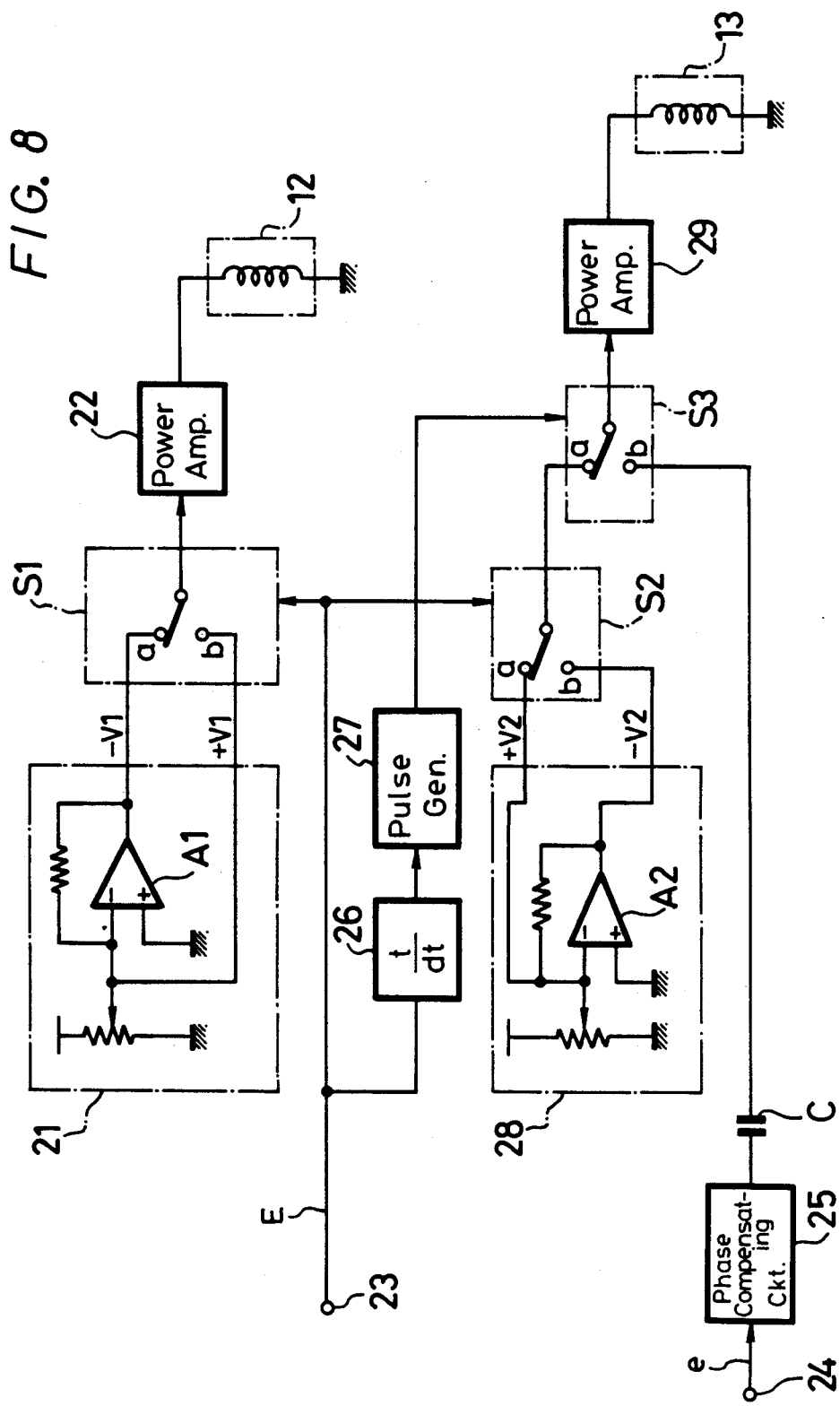
FIG. 8 is a block diagram showing a drive control circuit used in the rotation control for a magnet used in a magneto-optical recording system according to the present invention.

FIG. 8 is a block diagram showing an embodiment of the control circuit according to the present invention that controls the drive currents supplied to the coils 12 and 13.

Referring to FIG. 8, there is provided a power supply source 21 that supplies a current to the first coil 12. The power supply source 21 includes an inverting amplifier A1 which produces a voltage +V1 or −V1, which then is selected by a switch S1 at its fixed contact a or b.

The switch S1 is driven by a control signal E which indicates a recording or erase mode and is applied to an input terminal 23. Thus, when the optical disc recording apparatus is, for example, in the recording mode, the switch S1 is connected to the fixed contact b to permit the voltage +V1 to be supplied through an output amplifier 22 to the first coil 12 that is then supplied with current +i1. A switch S2 is also driven by the control signal E.

When the optical disc recording apparatus is in the erase mode, the switch S1 is connected to the fixed contact a and permits the voltage −V1 to be supplied through the output amplifier 22 to the first coil 12 which is then supplied with current −i1.

A signal e that detects the rotation position of the magnet 11 is applied to a terminal 24. This signal e is supplied through a phase compensating circuit 25 and a capacitor C to a switch S3 which will he described later. This position detected signal e is provided by a sensor, for example, a Hall element (shown by P in FIG. 5) mounted on the inner peripheral surface of the first coil 12.

An edge detector 26 is provided to detect the leading edge and the trailing edge of the control signal E. The output from this edge detector 26 is supplied to a pulse generator 27 which then produces a pulse signal at a predetermined time after the arrival of the edge detected by the edge detector 26. In response to the pulse signal from the pulse generator 27, the switch S3 is connected to its fixed contact a or b to select the signal to be supplied to the second coil 13.

The switch S3 receives at its fixed contact a voltage +V2 or −V2 that is to be supplied to the second coil 13 and at its fixed contact b the magnet position detected signal e.

A buffer amplifier 28 generating the voltages ±V2 is provided which includes an inverting amplifier A2 that produces the voltage −V2 of opposite polarity. An output amplifier 29 is connected between the switch S3 and the second coil 13.

Figure 9:
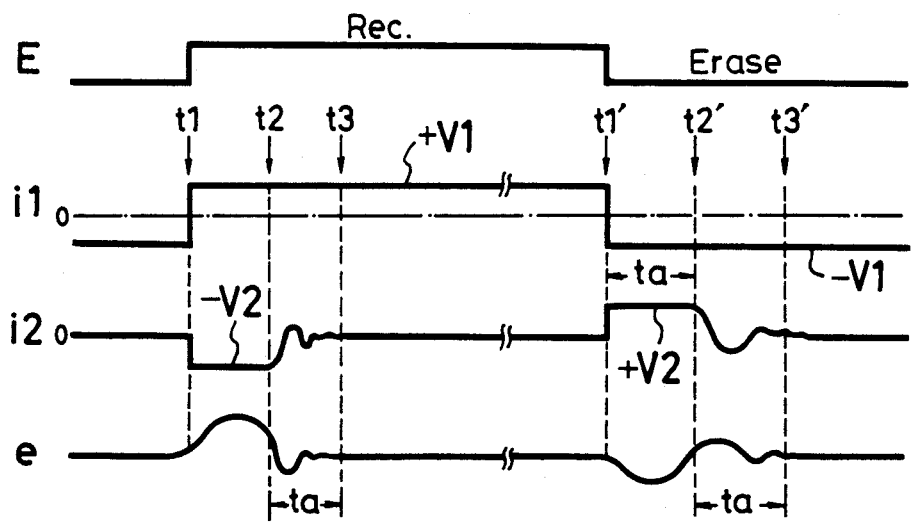
FIG. 9 is a waveform diagram of main portions of FIG. 8.

In this control circuit, when the optical disc recording apparatus is set in the recording mode at time t1 as represented by a waveform in FIG. 9, the switch S1 is connected to the fixed contact b to permit the voltage +V1 to be supplied through the output amplifier 22 to the first coil 12 so that the current +i1 flows through the first coil 12. Also, at this time, the switch S2 is connected to its fixed contact b to permit the voltage −V2 to be supplied through the fixed contact a of the switch S3 and the output amplifier 29 to the second coil 13 so that the current −i2 flows through the second coil 13.

Then, the magnet 11 begins to rotate. At time t2 before the magnet 11 completes its polarity inverting operation, the switch S3 is changed in position in response to the output pulse signal from the pulse generator 27. Thus, the switch S3 permits the A.C. component of the magnet position detected signal e to be supplied through its fixed contact b and the output amplifier 29 to the second coil 13.

Accordingly, as represented by the waveform in FIG. 9, a position servo loop is formed from time t2, whereby the magnet 11 is rapidly settled to the inverted position at time t3.

When the optical disc recording apparatus is set in the erase mode at time t1′, the switches S1 and S2 are both connected to the illustrated positions in FIG. 8 so that the first coil 12 is supplied with the current −i1 and the second coil 13 is supplied with the current +i2, thus rotating again the magnet 11 by 180°. Also in this case, at time t2′, the switch S3 is connected to its fixed contact b to permit the magnet rotation position detected signal e to be supplied to the second coil 13. Therefore, the position servo loop is formed before the completion of the inversion of the magnet 11 or from time t2′, so that the settling time ta of the magnet 11 can be reduced.

Figure 10:
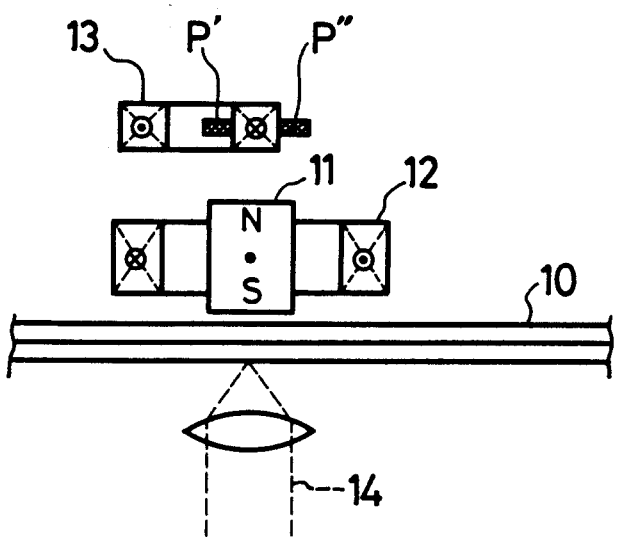
FIG. 10 is a diagram of another embodiment of the present invention, mainly illustrating the position at which a sensor of the invention is provided.

FIG. 10 illustrates another embodiment of the present invention. In FIG. 10, like parts corresponding to those of FIG. 5 are marked with the same references and therefore need not be described in detail.

According to this embodiment, as shown in FIG. 10, Hall elements P′ and P″, for example, sensors that detect the displacement of magnet 11 are located symmetrical relative to the central line of the magnet 11 and also mounted on the inside and the outside of the second coil 13. Two Hall elements, or sensors P′ and P″ are adapted to produce a differential output that makes the position detected signal Therefore, in this embodiment, the two sensors P′ and P″ are equally affected by the magnetic field formed by the second coil 13 and the magnetic fields generated from an external linear motor, two-axis mechanism and so on and therefore the outputs thereof are cancelled each other out, thus producing no output. Two sensors P′ and P″, however, respond at high sensitivity to the change of the magnetic field brought about by the rotation of the magnet 11 provided just below the two sensors P′ and P″. As a result, the two sensors P′ and P″ can detect only the rotational position of the magnet 11. Thus, by supplying the magnet rotation position detected signal e to the magnet inversion control circuit shown in FIG. 8, it is possible to more effectively act the feedback operation that settles the magnet 11.

According to this embodiment of FIG. 10, since the distance between the magnet 11 and the first coil 12 can be reduced more, it is possible to more effectively maintain the position of the magnet 11.

According to the rotation control for a magnet used in a magneto-optical recording system according to the present invention, as set forth above, since the second coil is located with the displacement from the central line of the first coil that inverts the magnet and the current flowing through the second coil is controlled in association with the position of the magnet, after having been inverted, the magnet can be settled in the predetermined direction in quite a short time of period.

It should be understood that the above description is presented by way of example only on the preferred embodiments of the invention and it will be apparent that many modifications and variations thereof could be effected by one with ordinary skill in the art without departing from the spirit or scope of the novel concepts of the invention, so that the scope of the invention should be determined only by the appended claims.

We claim as our invention:

1. A device for controlling rotation of a magnet operatively and rotatably located adjacent a surface of an optical recording type disk in a magneto-optical recording apparatus comprising, wherein said magnet rotates about an axis that extends parallel to said surface of said optical recording type disk, comprising:
   (a) first coil means disposed to surround said magnet to generate a magnetic field perpendicular to the surface of said optical recording type disk, said magnet being disposed in a center of said first coil means;
   (b) second coil means having a center positions eccentrically away from said center of said first coil means;
   (c) means for supplying to said first coil means a first drive current that causes said magnet to rotate so as to invert the polarity of said magnet relative to said surface of said optical recording type disk;
   (d) means for supplying to said second coil means simultaneously with the supply of first drive current, a second drive current that causes said magnet to rotate toward a side of said second coil means, said second drive current being reversed in polarity to the polarity of said first drive current; and
   (e) means for stopping the supply of said second drive current while said second magnet rotates, while maintaining the supply of said first drive current so as to cause said magnet to settle in position in a relatively short time period.

2. A device for controlling rotation of a magnet operatively and rotatably located adjacent the surface of an optical recording type disk in a magneto-optical recording apparatus, wherein said magnetic rotates about an axis that extends parallel to the surface of the optical recording type disk, comprising:
   (a) first coil means disposed to surround said magnet to generate a magnetic field perpendicular to the surface of said optical recording type disk, said magnet being disposed in a center of said first coil means;
   (b) second coil means having a center eccentrically positioned at a predetermined distance away from said center of said first coil mans and disposed to generate a second magnetic field perpendicular to the surface of said optical recording type disk;
   (c) sensor means for detecting rotational displacement of said magnetic;
   (d) means for supplying to said first coil means a first drive current that causes said magnet to rotate so as to invert the polarity of said magnet relative to the surface of said optical recording type disk;
   (e) means for supplying to said second coil means a second drive current that causes said magnet to rotate toward a side of said second coil means, said second drive current being reversed in polarity to the polarity of said first drive current;
   (f) means for stopping the supply of said second drive current while said magnet rotates; and
   (g) means for supplying a signal from said sensor means to said second coil means to reduce a time necessary for said magnet to settle.

3. The device of claim 2, wherein said sensor means is subject to a magnetic field generated by said second coil means to produce a differential output signal.

4. The device of claim 2, wherein said sensor means comprises two Hall sensors.

5. The device of claim 4, wherein said two Hall sensors are mounted on inner and outer surfaces of said second coil means.

6. A magneto-optical recording apparatus, comprising:
   an optical recording disk having a recording surface;
   a magnet rotatably positioned adjacent said recording surface, the poles of said magnet aligning perpendicularly to said recording surface, the magnet rotating about an axis that is parallel to said recording surface;
   a first coil positioned concentrically about said magnet and parallel to said recording surface, said first coil capable of generating a magnetic field that causes said magnet to align perpendicularly to said recording surface in response to receipt of a first drive current;
   a second coil positioned near said magnet and having a center being off-set in position relative to a center of said first coil along a radius of said disk, said second coil generating a magnetic field adjacent said magnet in response to receipt of a second drive current so as to cause said magnet to rotate out of said perpendicular alignment; and
   a controller for supplying said first and said second drive currents in time relation so that said drive currents are initially applied simultaneously and then said second drive current is removed while said first drive current is maintained so as to cause said magnet to settle in position in a relatively short time period.

7. A system for controlling rotation of a magnet used in recording information on an optical recording disk in a magneto-optical recording apparatus, said magnet being operatively and rotatably positioned adjacent a recording surface of said disk, comprising:
   a first coil positioned to concentrically surround said magnet, said first coil defining a first plane parallel to said recording surface within which an axis of rotation of said magnet is located, said axis of rotation extending parallel to said recording surface, said first coil generating a magnetic field perpendicular to said recording surface with which said magnet aligns in response to receipt of a first drive current;
   a second coil positioned adjacent said first coil but having a center off-set from a center of said first coil so as to produce a magnetic field adjacent said magnet in response to receipt of a second drive current, said second coil defining a plane parallel to the plane of said first coil, said second coil being positioned so that said first coil is positioned between said second coil and said recording surface; and
   a controller supplying said first and second drive currents in timed relation so that said drive currents are initially applied simultaneously and then said second drive current is removed while said first drive current is maintained so as to cause said magnet to settle in position in a relatively short time period.

* * * * *